US006085580A

United States Patent [19]
Ludeke et al.

[11] Patent Number: 6,085,580
[45] Date of Patent: Jul. 11, 2000

[54] DIFFERENTIAL FORCE MICROSCOPE

[75] Inventors: Rudolf Ludeke, Millwood, N.Y.; Huajun Wen, Austin, Tex.

[73] Assignee: International Business Machines Corporation, Armonk, N.Y.

[21] Appl. No.: 09/024,527

[22] Filed: Feb. 17, 1998

[51] Int. Cl.[7] .......................... G01N 21/00; G01B 15/00
[52] U.S. Cl. ......................... 73/105; 250/306; 250/307; 250/492.2
[58] Field of Search .............................. 73/105; 250/306, 250/307, 492.2, 492.3

[56] References Cited

U.S. PATENT DOCUMENTS

| | | | |
|---|---|---|---|
| 4,777,364 | 10/1988 | Sartore | 250/306 X |
| 4,837,435 | 6/1989 | Sakuhara et al. | 250/306 |
| 4,942,299 | 7/1990 | Kazmerski | 250/307 X |
| 5,440,122 | 8/1995 | Yasutake | 250/306 X |
| 5,444,260 | 8/1995 | Kazmerski | 250/306 X |

OTHER PUBLICATIONS

Terris et al., "Localized Charge Force Microscopy", J. Vac. Sci. Technol. A., vol. 08, No. 01, Jan./Feb. 1990, pp. 374–377.

*Primary Examiner*—Daniel S. Larkin
*Attorney, Agent, or Firm*—Ohlandt, Greeley, Ruggiero & Perle

[57] ABSTRACT

The present invention is a differential force microscope (DFM) for identifying an individual atom of a substrate, such as a dopant or impurity atom. The DFM includes a light source which can be controlled to turn ON and OFF to cause alternate excitation and relaxation of an atom in the substrate. An atomic force microscope (AFM) includes an electrically conductive tip (AFM tip) positionable adjacent to a surface of the substrate to measure an attractive force or equivalent thereof exerted by the atom on the AFM tip. When the tip is positioned adjacent to the atom, the tip is influenced by attractive forces exerted on the tip by the atom in both the relaxed state and the excited state. A differential amplifier amplifies the attractive forces to produce an output signal corresponding to a differential attractive force exerted by the atom in the relaxed state and the excited state. As the excitation energy of any atom is unique, it is then possible to identify the specific atom and, moreover, to determine a concentration of such an atom in the substrate.

16 Claims, 5 Drawing Sheets

DIFFERENTIAL FORCE MICROSCOPE

FIELD OF THE INVENTION

The present invention relates to atomic force microscopes (AEMs) and, more particularly, to an AFM-based differential force microscope for detecting individual atoms of a substrate.

BACKGROUND OF THE INVENTION

The successful implementation of future sub 0.1 $\mu$m semiconductor designs into marketable chips depends to a large degree on verifying the manufacturability of optimally designed device structures. Key design criteria for modeling and the realization of optimal performance are the tailored distributions (shapes) and concentration gradients of implanted dopant atoms within the active region of the device and their confirmation by analytical methods. Dopant concentrations are expected to be in the $10^{18}$ to $10^{20}$/cm$^3$range, which corresponds to an average dopant atom separation of 10 nm (nanometer) to 2.2 nm, respectively. Furthermore, the dopant implanted regions are expected to be delineated or defined over dimensions of the order of 5 to 20 nm in the device, which places unrealizable demands on analytical methods to establish the existence of such intended structures. In essence, the verification of such highly delineated structures requires a technique that is sensitive to a broad range of dopant distributions and that exhibits a spatial resolution of 5 nm or less.

Historically, quasi-quantitative etching and staining methods sensitive to dopant concentrations have been used, followed by examinations with optical or electron microscopes. These methods exhibit unacceptable resolutions for modern device technology.

More recently, two methods have been proposed that are based on an atomic force microscope (AFM) fitted with an electrically conducting tip. The first method correlates the changes in resistance (called the spreading resistance) measured by directly contacting the semiconductor with the AFM tip to determine the doping concentration (P. De Wolf et al. J. Vac. Sci. Technol. A13, 1699 (1995)). Such a method claims a resolution of 50 nm.

The second AFM-based method measures the capacitance under the AFM tip, which is then correlated to the dopant concentration (Y. Huang, C. C. Williams and J. Slinkman, Appl. Phys. Lett. 66, 344 (1995)). This instrument, referred as the Scanning Capacitance Microscope (SCM), has been commercialized by Digital Instruments, Inc., Santa Barbara, Calif. The instrument claims a resolution of about 10 nm.

Aside from the limited resolution, which is dependent on the tip size and shape, as well as dopant concentrations, both of the above AFM methods suffer from excessive tip wear, are computationally intensive in extracting dopant concentrations, require calibration standards and are chemically insensitive to the dopant type and polarity.

Accordingly, it is an object of the present invention to provide an AFM-based microscope and method that provide improved resolution based on intrinsic physical arguments, instead of on dopant concentrations.

It is a further object of the present invention to provide an AFM-based microscope and method that can identify individual atoms to measure a broad range of concentrations.

Another object of the present invention is to provide an AFM-based microscope and method that is predominantly sensitive to dopant atoms within 1 to 5 nm of a substrate surface.

It is a further object of the present invention to provide a self calibrating AFM-based microscope which measures isolated dopant atoms.

It is also an object of the present invention to provide an AFM-based microscope that is chemically specific through appropriate choices of the exciting light frequency.

Another object of the present invention is to provide an AFM-based microscope and method that minimizes tip wear.

SUMMARY OF THE INVENTION

The present invention is a differential force microscope (DFM) for identifying an individual atom of a substrate, such as a dopant or impurity atom. The DFM includes a light source which can be controlled to turn ON and OFF to cause alternate excitation and relaxation of an atom in the substrate. An atomic force microscope (AFM) includes an electrically conductive tip (AFM tip) positionable adjacent to a surface of the substrate to measure an attractive force or equivalent thereof,exerted by the atom on the AFM tip. When the tip is positioned adjacent to the atom, the tip is influenced by attractive forces exerted on the tip by the atom in both the relaxed state and the excited state. A differential amplifier amplifies the attractive forces to produce an output signal corresponding to a differential attractive force exerted by the atom in the relaxed state and the excited state. As the excitation energy of any atom is unique, it is then possible to identify the specific atom and, moreover, to determine a concentration of such an atom in the substrate.

DETAILED DESCRIPTION OF THE PREFERRED EMBODIMENTS

Before proceeding with a detailed explanation of the present invention, it is well to define certain terms to be used herein. The term "attractive force" refers to a force exerted by an atom of a substrate on a conductive tip of an atomic force microscope in a direction to cause the tip to move towards the atom. "Differential attractive force" refers to the difference between the forces of the atom and surrounding material when the atom is in an excited state and those for the atom and surrounding material when the atom is in a relaxed or neutral state. An atom in the excited state refers to a charged atom.

Figure 1:
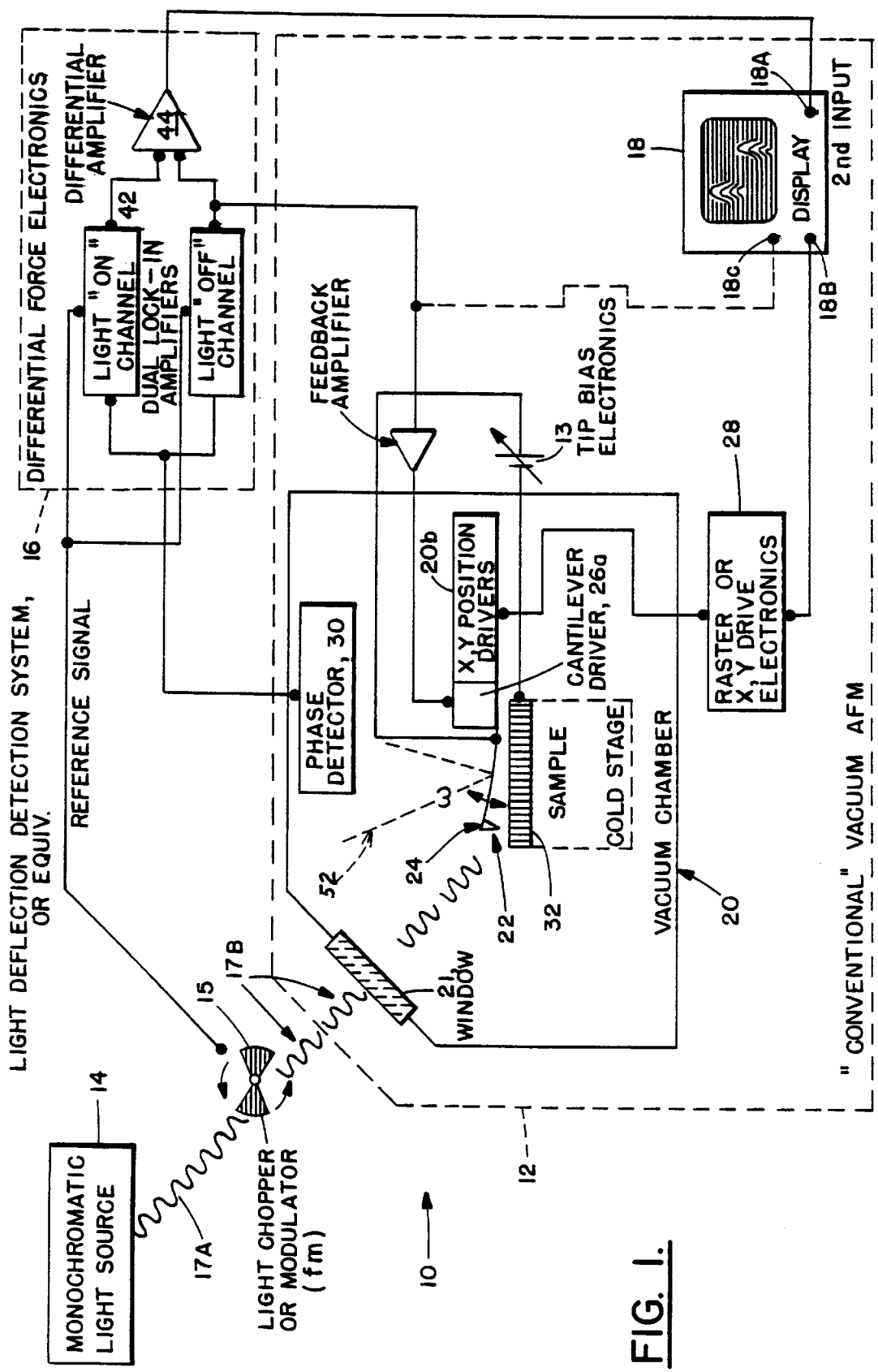
FIG. 1 illustrates an overall block diagram of a differential force microscope (DFM), in accordance with the present invention.

FIG. 1 illustrates a differential force microscope (DFM) 10 for identifying an individual atom, such as a dopant or impurity atom, of a substrate 32. DFM 10 includes a light source 14 and a light chopper 15 which, in combination, emit light pulses 17 of a suitable amplitude and frequency onto substrate 32. Light pulses 17 cause alternate excitation and relaxation of the electronic states inherent to the individual atom at a near-surface region of substrate 32.

DFM 10 further includes an atomic force microscope (AFM) 12 having an electrically conductive tip 22 ("AFM tip 22"). AFM 12 measures the attractive forces, or equivalents thereof, exerted on AFM tip 22 by the individual atom of substrate 32 in the relaxed and excited states. Differential force electronics 16 then differentially amplifies the forces to produce an output signal corresponding to the differential force of the individual atom in the relaxed and excited states. The differential force applied by the individual atom can then be viewed through the use of a display device 18.

Since any charge on the surface of substrate 32 may produce such attractive forces on AFM tip 22, it is important to distinguish between a charge in the atom (whose concentration is to be measured) from other impurity atoms absorbed on the surface of substrate 32 during sample preparation, subsequent handling, and so forth. The latter has different excitation and neutralization energetics and is not expected to be excited and neutralized by the emission of light pulses 17B.

By measuring the difference in the attractive force exerted on AFM tip 22 by the atom, the specific atom to whose ionization energy the light is tuned can be detected and identified. The underlying reason is that the excitation of a particular atom is characterized by a unique signature, such as a specific energy that is dependent on the atom and its chemical environment. Accordingly, it can be appreciated that the detection of a differentially detected excited atom uniquely establishes its chemical nature and discriminates against other dissimilar atoms or similar atoms in a different chemical bonding environment. That is, the differential attractive force of the atom in the excited state and the relaxed state is unique to the specific atom. DFM 10 can thus be employed to detect and identify an individual atom of substrate 32 and, moreover, to determine a concentration of such an atom in substrate 32.

The present invention provides a technique that is sensitive to an atom in a specific chemical or bonding environment of the bulk lattice. Such an arrangement is particularly useful in determining the concentration of dopant or impurity atoms embedded in substrate 32. The present invention also provides the following advantages over other approaches and devices for ascertaining the concentration of a specific atom in a substrate:

(1) DFM 10 provides increased resolution, possibly as low as about 2 nm, based on intrinsic physical arguments, instead of on dopant concentrations;

(2) DFM 10 is capable of measuring a broad range of concentrations, even those greater than $10^{20}$ atoms/cm$^3$ since the presence of two or more charged impurity atoms below the resolution limit is readily detected, as the forces are additive;

(3) DFM 10 is sensitive predominantly to dopant atoms within about 1 to 5 nm of the surface;

(4) DFM 10 is self calibrating since it measures isolated dopant atoms;

(5) DFM 10 is chemically specific through appropriate choice of the exciting light frequency;

(6) DEM 10 minimizes tip wear since AFM tip 22 moves only in the absence of light (minimal force) or in the freely vibrating non-contact mode; and (7) The application of a suitable bias voltage to tip 22 by means of bias supply 13 causes the region where impurity charging/neutralization occurs to lie deeper from the surface by virtue of band bending. This allows a degree of in situ depth profiling without removal of the sample and stripping of a surface layer.

Turning to a more detailed description of the present invention, DEM 10 includes a light source 14, such as a narrow band or monochromatic light source, and a chopper 15 for emitting light pulses 17 to cause alternate excitation of the atom between the relaxed and excited states. Light source 14 is preferably a light generating source tuned to the binding energy of the particular atom to be analyzed. Light source 14 is preferably a tunable laser, and chopper 15 preferably chops light 17A into light pulses 17B at a rate sufficiently slow to allow AFM 12 to respond to the light induced changes under AEM tip 22. Light 17A and light pulses 17B do not necessary have to be focused, but should be of sufficient intensity to excite most of the atoms (whose concentration is to be measured) while the light is ON.

When analyzing dopant concentrations in semiconductors, light source 14 preferably emits light in the infrared (about 1 to 30 $\mu$m) or far infrared (greater than 30 am) region of the spectrum. Although the above describes a preferred arrangement of exciting and relaxing the atom, the alternate excitation and relaxation of the atom may also be accomplished by manually or automatically turning a suitable light source to an ON and OFF state or in any other manner to produce controllably alternate excitation and relaxation of the atom.

Referring still to FIG. 1, AFM 12 includes a vacuum chamber 20 for housing a cantilever 22 and AFM tip 24 connected to cantilever 24. A substrate holder (not shown) holds substrate 32 in manner such that a surface of substrate 32 is in adjacent relationship to AFM tip 22. Vacuum chamber 20 further includes a window 21 made of an optically transparent material. Window 21 is arranged to allow light pulses 17B to pass therethrough onto substrate 32.

A cantilever driver 26A in combination with raster or X-Y drive electronics 28 are employed to move, selectively, cantilever 24 in the X and Y direction across the surface of substrate 32. Cantilever 24 has a natural oscillation frequency ($\omega_0$). In a preferred embodiment, a phase detector or frequency converter 30 senses the motion of cantilever 24 via reflected light beam 52 and detects a phase shift or frequency shift ($\Delta\omega$) of cantilever 24 with respect to the natural oscillation frequency ($\omega_0$) of the cantilever. The phase shift ($\Delta\omega$) is proportional to the differential attractive force exerted on AFM tip 22 by the measured atom.

Differential force electronics 16, connected to an output of phase detector 30, differentially amplifies the output signals of phase detector 30 to produce an output signal corresponding to the differential attractive force of the measured atom. It is preferred that differential force electronics 16 is gated at a frequency corresponding to the operating frequency ($f_m$) of light chopper 15 to produce synchronously an output signal corresponding to the differential attractive force of the measured atom in the relaxed state and the excited state. Differential force electronics 16 are preferably a dual lock-in amplifier which includes a dual lock-in detector 42 and a differential amplifier 44.

Figure 2:
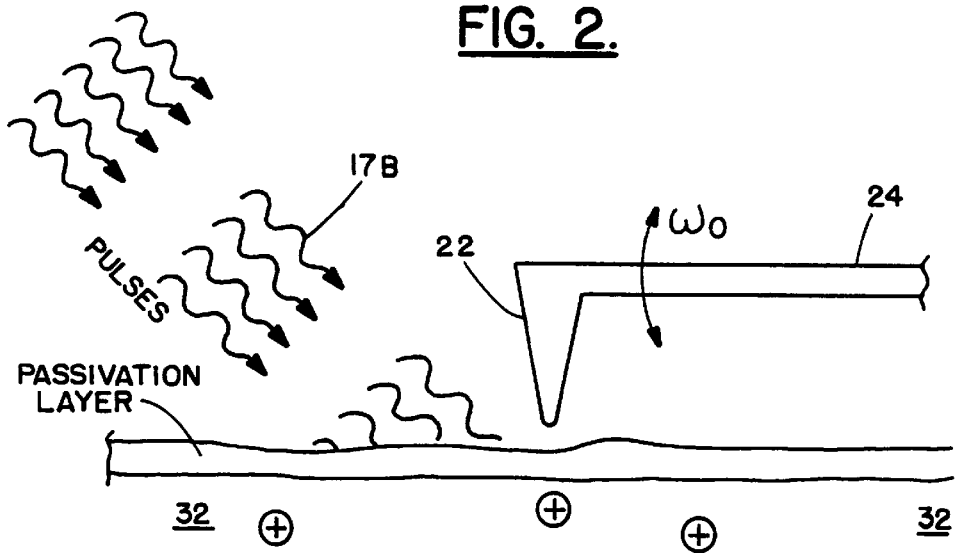
FIG. 2 illustrates a typical implementation of the DFM of FIG. 1 illuminating modulated light onto a substrate to cause alternate excitation of an individual atom between a relaxed state and an excited state.

Referring to FIG. 2, there is shown an exploded view of AFM 12 of FIG. 1. Light source 14 in combination with light chopper 15 emit light pulses 17B onto a surface of substrate 32 to excite and neutralize the individual atoms. It is preferred that chopper 15 is operated at a frequency ($f_m$) such that AFM 12 can synchronously measure the attractive forces (or an equivalent thereof) of the individual atom in the relaxed state and the excited state.

Figure 3A:
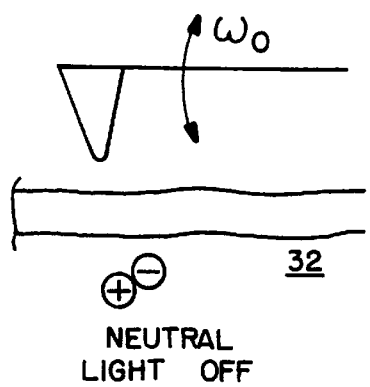
FIG. 3A illustrates an exploded view of an AFM conductive tip and a cantilever of FIG. 1 positioned over an individual atom in a relaxed or neutral state.
Figure 3B:
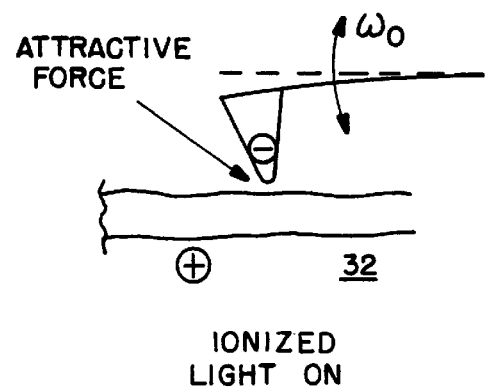
FIG. 3B illustrates an exploded view of the AFM conductive tip and the cantilever of FIG. 3A positioned over the individual atom in an excited state, i.e., charged.
Figure 4:
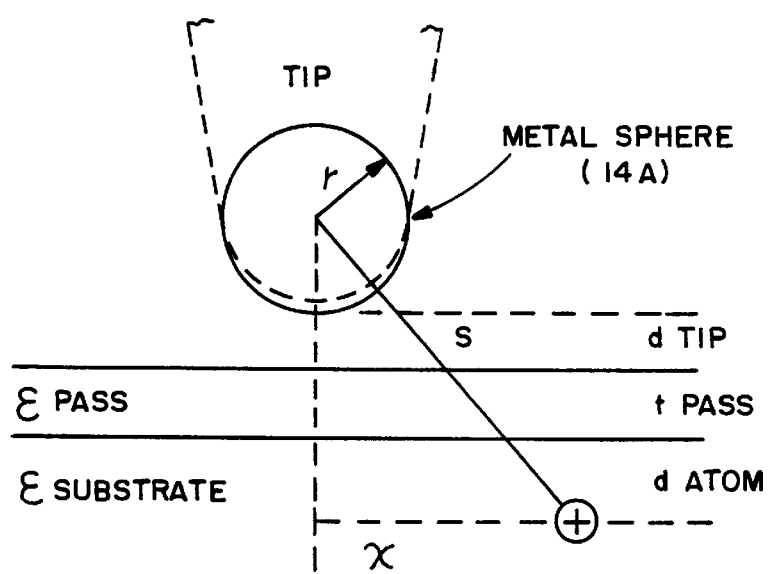
FIG. 4 identifies particular variables on the DFM which are utilized to determine an attractive force applied by an individual atom on a conductive tip of the DFM, in accordance with a first embodiment for measuring the differential attractive force of the individual atom on a conductive tip of the DFM.

It should be noted that in FIGS. 2 through 4, the AFM tip is vastly out of proportion (too small) relative to the atoms and the thickness of the passivation layer. The latter are of the order of nanometer, whereas the tip and cantilever are of the orders of about 0.1 to 1 mm.

FIG. 3A illustrates AFM tip 22 positioned over an individual atom (of substrate 32) that is in the relaxed or neutral state. As shown, the individual atom in the relaxed state does not exert an attractive force on AFM tip 22. The oscillation frequency of cantilever 24 is thus the natural oscillation frequency ($\omega_0$).

FIG. 3B illustrates AFM tip 22 positioned over the individual atom of substrate 32 that is in the excited state (i.e., a charged atom). The excited atom induces a polarization charge on AFM tip 22, thereby generating an attractive force between AFM tip 22 and the charged atom. The attractive force causes AFM tip 22 to move towards the excited atom and alters the oscillation frequency ($\omega_{EXCITED}$) of cantilever 24.

An operational example of the present invention is provided below. Initially, a sample of substrate 32 to be studied is cut and polished along a desired cross-section. Substrate 32 is then placed in vacuum chamber 20 with a surface of the substrate positioned in adjacent relationship to AFM tip 22.

It is important to understand that the atoms (to be measured) of substrate 32 should remain in the relaxed state, absent intentional excitation by modulated light source 14. For example, the investigation of dopant atoms in semiconductors may require substrate 32 to be cooled in order to prevent thermal energies from ionizing the dopant atoms. It may also be advantageous to apply a small bias to AFM tip 22 via bias supply 13 in order to maintain locally, the dopant atoms in their neutral state, in the absence of light from modulated light source 14, or to prevent premature neutralization in the presence of light by pushing the charge away from the ion.

Alternatively, this may also be accomplished by applying a thin passivation layer, preferably about 1 nm thick (as shown in FIGS. 2, 3A, and 3B). The passivation layer minimizes interface states from ionizing the impurity through band-bending effects. For a silicon substrate, the preferred passivation layer is a thin thermal oxide layer. Even in this case, it may be still advantageous to supply a bias to tip 22 in order to maintain the desired excited and neutral states in the presence and absence, respectively, of the light pulse.

Thereafter, AFM tip 22 can be selectively moved across a surface of substrate 32 (via X-Y driver 26b and X-Y drive electronics 28) to scan substrate 32 for a specific type of atom, such as an impurity or dopant atom. Note that Raster or X-Y drive electronics 28 are operated by a control computer (not shown) in conventional vacuum AFM 12. The movement of AFM tip 22 is preferably configured to correspond with the frequency ($f_m$) of the light pulses 17 so that AFM 12 can synchronously measure the attractive forces of the atom in the relaxed state and the excited state. The resolution of DFM 10 can be adjusted by selecting an appropriate AFM tip 22 radius. The smaller the AFM tip radius the better the resolution.

When AFM tip 22 is positioned in adjacent relationship (i.e., above) to an atom in the near-surface region of substrate 32, the AFM tip will not experience an attractive force if the atom is in the relaxed state, i.e., the light is in the OFF state (FIG. 3A). However, when light pulse 17B impinges onto the surface of substrate 32 (i.e., the light in the ON state), the atom absorbs the energy of light pulse 17B and is excited, i.e., charged. The excited atom induces a polarization charge on AFM tip 22 that results in an attractive force typically on the order of several to tens of pico-Newtons (which is a force readily detected by AFM 12).

DFM 10 can then detect the attractive forces of the atom in the relaxed and excited states to determine the differential attractive force. The differential attractive force or the equivalent thereof can be determined using various methods, such as measuring the electrostatic force of AFM tip 22, measuring a phase shift or frequency shift of the natural oscillation frequency of AFM tip 22, or any other force-based methodology to estimate the differential attractive force.

In the preferred embodiment, the measurement of the differential attractive force is conducted by phase detector 30 in combination with a differential force electronics 16. Phase detector 30 is employed to detect a phase or frequency shift ($\Delta\omega=\omega_{EXCITED}-\omega_0$) which is proportional to the differential attractive force of the atom in the excited state and the relaxed state. Phase detector 30 produces an output signal corresponding to the phase or frequency shift ($\Delta\omega$). Differential force electronics 16 differentially amplifies the output signal of phase detector 30 to produce an amplified output signal corresponding to the differential attractive force.

The output signal of differential force electronics 16 is then inputted to a Z-input 18a of display device 18, and the output signal of raster or 28 X-Y drive electronics is inputted to the X-Y 18b input of display device 18. In this way, display device 18 can display the differential attractive force or equivalent thereof of any measured atom of substrate 32. As in conventional AFM arrangements, the output signal corresponding to the dark portion of the cycle of phase detector 30 can also be inputted via terminal 18c to display device 18 to view the topography of the substrate and is further applied as a control signal, via a feedback amplifier, to cantilever driver 26a. The above arrangement allows the differential attractive forces of measured atoms to be viewed in the context of the topography of substrate 32 to provide a more detailed view of the identified atom of substrate 32.

As the differential attractive force of an atom is unique to that atom, the determination of the differential attractive force enables detection and identification of the measured atom. Accordingly, DFM 10 may be employed to scan a selected portion of a surface of substrate 32 to detect and count the number of atoms whose concentration is to be determined (i.e., a dopant or impurity atom). The concentration of the atom can then be determined using the number of the particular atoms found in a known selected area of substrate 32.

To further explain the present invention, provided below are several approaches for determining the differential attractive force or equivalent thereof exerted by a measured atom on AFM tip 22 of substrate 32. In a first embodiment, the differential attractive force exerted on AFM tip 22 by a measured atom of substrate 32 is described below with reference to FIGS. 3A and 3B. The first embodiment employs phase or frequency shift ($\Delta\omega$) detection methods to estimate the differential attractive force exerted by a measured atom. In particular, the attractive forces of the atom in the relaxed state and the excited state can be estimated by measuring the phase or frequency shift of cantilever 24 when the atom in the relaxed state (FIG. 3A) and the excited state (FIG. 3B). For the atom in the relaxed state, the oscillation frequency of cantilever 24 is the natural oscillation frequency ($\omega_0$) of cantilever 24. For the atom in the excited state, the oscillation frequency of cantilever 24 is an oscillation frequency denoted by $\omega_{EXCITED}$. The frequency shift ($\Delta\omega$) is thus $\omega_0 - \omega_{EXCITED}$ or vice-versa which is proportional to the differential attractive force. The differential attractive force of the measured atom can then be estimated by determining the difference in the force gradient with the following equations:

$$\Delta F'_{min} = -(1/A)[(cBkT)/\omega_0^3 Q)]^{1/2} \Delta\omega \qquad <1>$$

where:

A is the amplitude of the AFM cantilever;

c is the spring constant of the AFM cantilever;

B is the detection bandwidth (approximately in the range of $10^3$ Hz);

k is Boltzmann constant;

T is the temperature;

Q is the quality factor of the cantilever (>$10^4$) in a vacuum;

$\Delta\omega$ is the frequency shift of the AFM cantilever, i.e., $\Delta\omega = \omega_{EXCITED} - \omega_0$;

$\omega_0$ is the natural oscillation frequency of the AFM antilever; and $\omega_{EXCITED}$ is the oscillation frequency of the AFM antilever with the measured atom in the excited state.

The first embodiment provides an accurate force-based methodology with the capability of detecting attractive force gradients at least in the 0.21×$10^{-4}$ N/m range (i.e., for c=1 N/m, $\omega_0 = 10^5$ Hz, A=1 nm and T=30° Kelvin)

A second embodiment for determining the differential attractive force applied on AFM tip 22 is described below with reference to FIG. 4. The second embodiment employs amplitude shift methods to estimate the magnitude of the differential attractive force exerted by a measured atom. The attractive force (F) on AFM tip 22 due to the passivity of atom (i.e., a single charged impurity) can be estimated by calculating an electrostatic force on a conducting sphere 14A (representative of AFM tip 22). The attractive force (pico-Newtons) of the measured atom can be estimated using the following equation:

$$F = (230/\epsilon_{EFF})(r/s^3)(1/(1-(r^2/s^2))^2) \qquad <2>$$

where:

$S = [(r + d_{TIP} + t_{PASS} + d_{ATOM})^2 + X^2]^{1/2}$;

r=AFM tip radius;

$d_{TIP}$=distance between the AFM tip and the passivation layer;

$t_{PASS}$=passivation layer thickness;

$d_{ATOM}$=distance of the atom from the surface of the substrate;

$\epsilon_{EFF} = ((4\epsilon_{PASS})/((\epsilon_{SUB} + \epsilon_{PASS})(\epsilon_{PASS} + 1)))^2$;

$\epsilon_{PASS}$=passivation layer dielectric constant; and $\epsilon_{SUB}$=substrate dielectric constant.

x=distance between the tip and the atom in question (see FIG. 4).

The perpendicular force (F$\perp$) on the AFM tip can then be determined with the light in the ON state and OFF state through the use of the following equation:

$$F\perp = F \sin \theta = ((r+d)/s)F \qquad <3>$$

The differential attractive force ($F_{DIFF}$) of the atom being examined can then be determined by the formula:

$$F_{DIFF} = F_{\perp EXCITED} - F_{\perp RELAXED} \qquad <4>$$

The differential attractive force is determined in pico-Newtons (p-N), a range readily detectable by AFM 12.

As with the first embodiment, the differential attractive force can also be estimated by determining the differential electrostatic force gradient through the use of the following equation:

$$F' = (-0.23/r^3 \epsilon_{EFF})[3(r/s)^4(1/(1-(r^2/s^2)^2)) + 4(r/s)^6(1/(1-(r^2/s^2)^3))]$$

The differential attractive force ($F_{DIFF}$) of the atom being examined can then be estimated by the equation:

$$F'_{DIFF} = F'_{EXCITED} - F'_{RELAXED} \qquad <4>$$

In either case, the differential attractive force can then be estimated by determining the differential electrostatic force or force gradient. The differential attractive force can then be employed to determine the identity of the atom as well as the concentration of the atom in substrate 32.

Referring to FIGS. 5A through 5E, there is provided various graphs describing the interrelationship between the resolution, the vertical force (F), the vertical force gradient (F'), the excited atom depth ($d_{ATOM}$), the passivation layer thickness ($t_{PASS}$), AFM tip radius, and other factors.

Figure 5B:
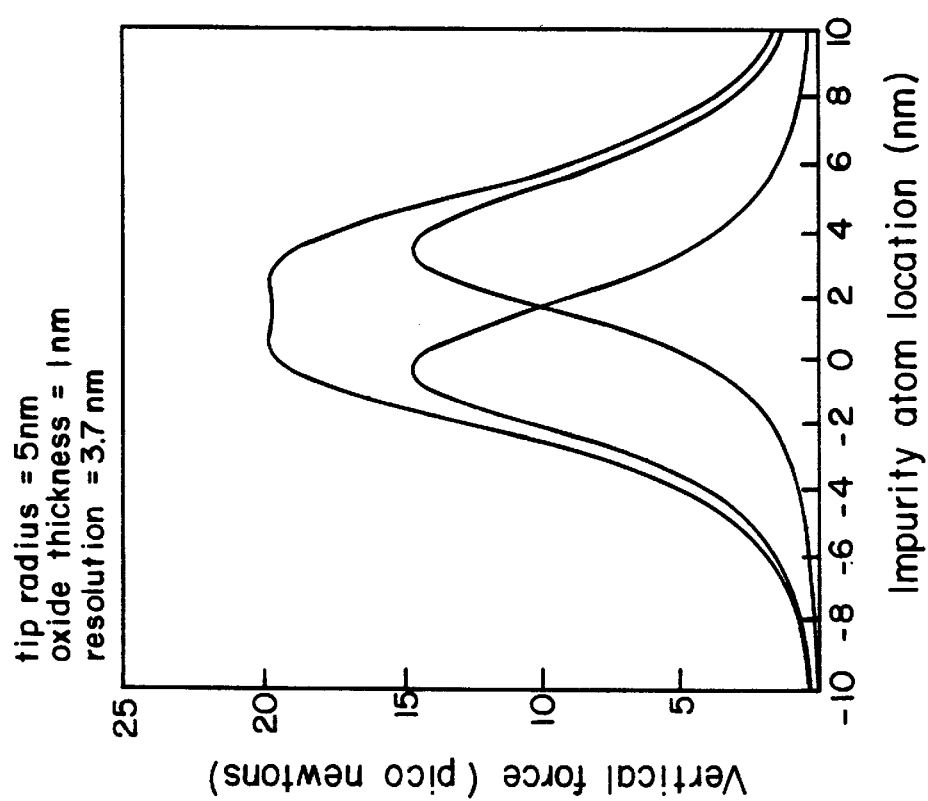
FIG. 5B is a graph of the vertical force as a function of the lateral impurity atom location.
Figure 5A:
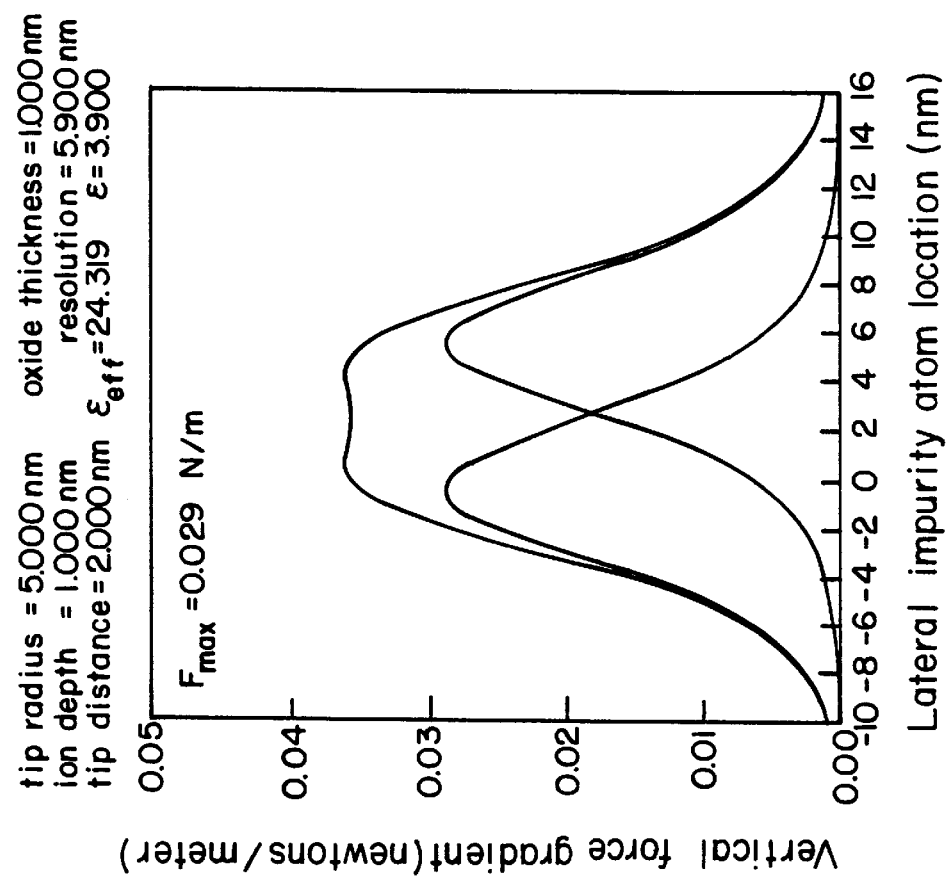
FIG. 5A is a graph of the vertical force gradient as a function of the lateral impurity atom location.

FIG. 5A is a graph of the vertical force gradient as a function of the lateral position along a line over two ionized impurity atoms separated by 5.9 nm, assuming that the tip radius=5.0 nm, depth of the atom=1.0 nm, the tip distance= 2.0 nm, passivation layer thickness=1.0 nm, $\epsilon_{EFF}$=24.319, and $\epsilon$=3.9. FIG. 5B is a graph of the vertical force as a function of the lateral impurity atom location. The vertical force gradient should dip between the two atoms, which is used here to define the resolving power of the instrument. In this case, the resolution is=5.9 nm.

Figure 5D:
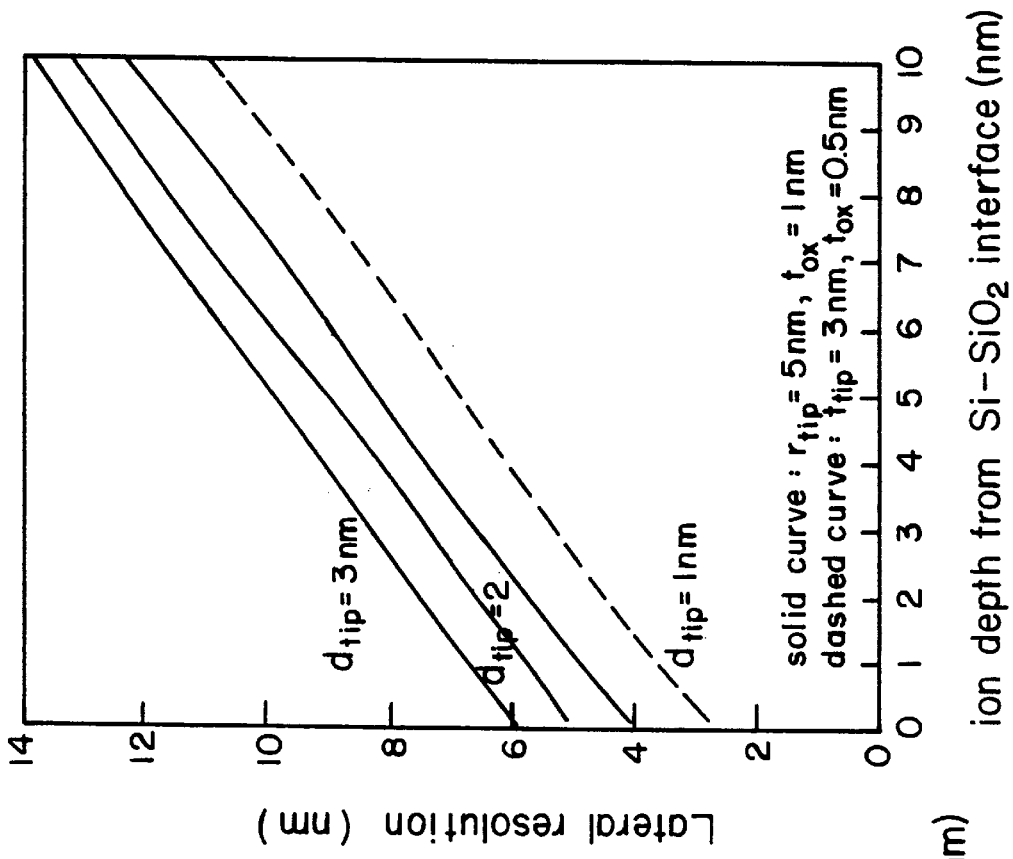
FIG. 5D is a graph of the lateral resolution as a function of the depth of the atom from the interface between the passivation layer (i.e., $SiO_2$) and the substrate (i.e., Si).
Figure 5C:
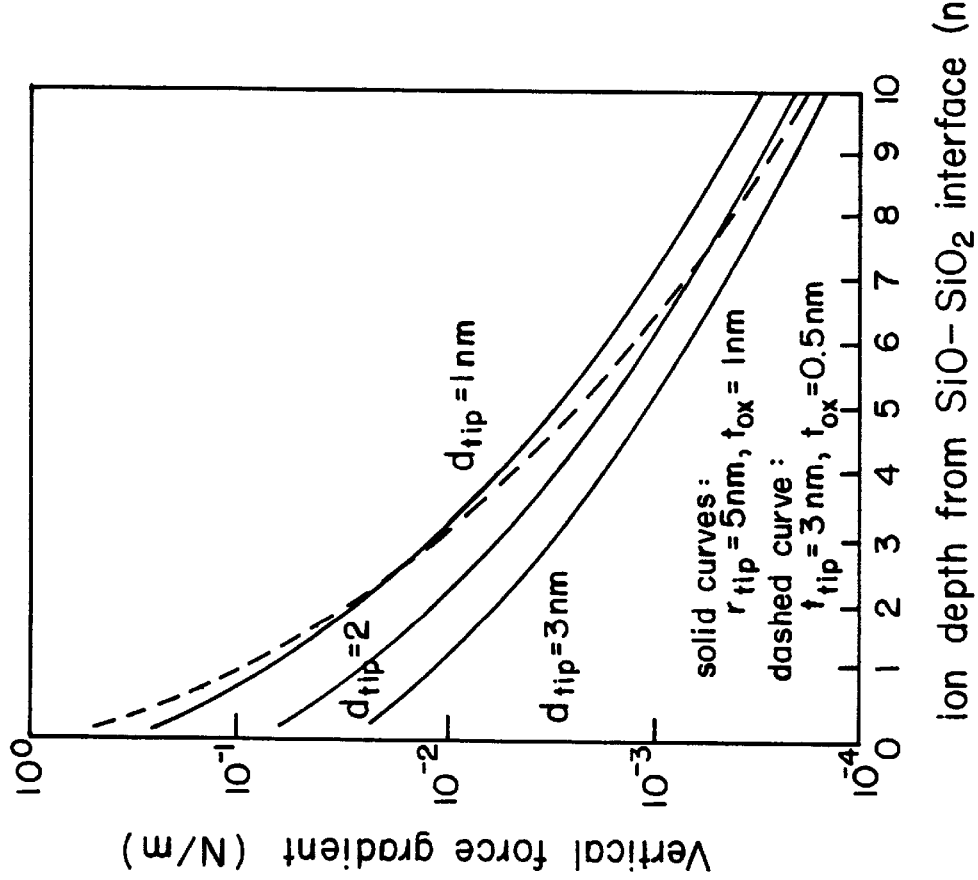
FIG. 5C is a graph of the vertical force gradient as a function of the depth of the atom from the interface between the passivation layer (i.e., $SiO_2$) and the substrate (i.e., Si).

FIG. 5C is a graph of the vertical force gradient as a function of the depth of the atom from the interface between the passivation layer (i.e., $SiO_2$) and the substrate (i.e., Si). The vertical force gradient exerted by a charged atom varies inversely with the depth of the atom and the distance of the AFM tip to the surface of the passivation layer.

FIG. 5D is a graph of the lateral resolution as a function of the depth of the atom from the interface between the passivation layer (i.e., $SiO_2$) and the substrate (i.e., Si). A higher lateral resolution can be obtained with smaller distances (dTIP) between the AFM tip and the passivation layer, decreased atom depth from the atom to the surface of the passivation layer, and/or a smaller AFM tip radius.

Figure 5E:
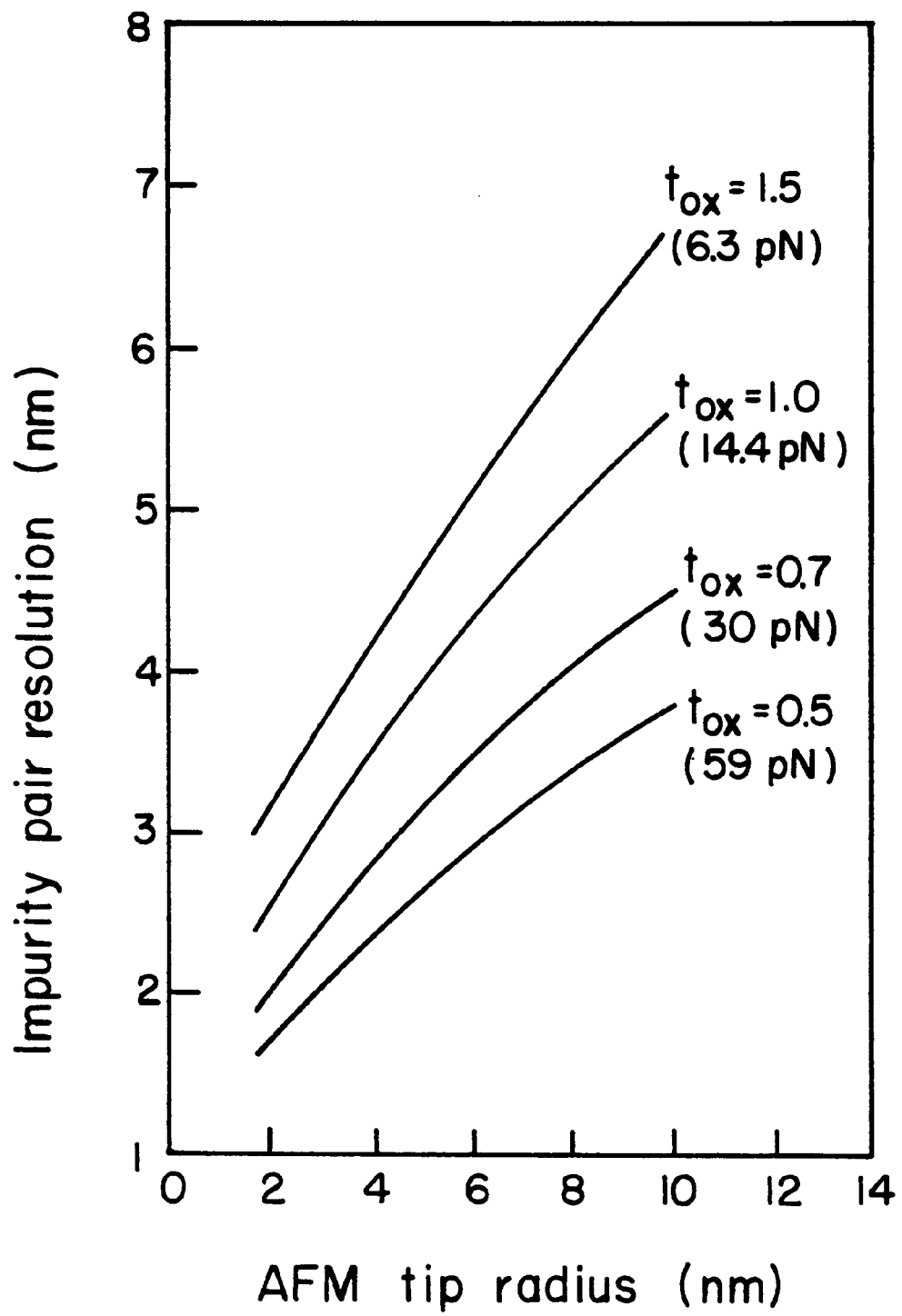
FIG. 5E illustrates a graph of the impurity pair resolution as a function of a radius of a conductive AFM tip.

FIG. 5E illustrates a graph of the impurity pair resolution as a function of a radius of a conductive AFM tip for the second embodiment. Resolution as used herein refers to the ability to resolve distinctly the signals of two atoms relative to the distance between the two atoms. The resolution can thus be adjusted according to at least the radius of the AFM tip. The variable $t_{ox}$ refers to the thickness of the passivation layer, and the value in the parenthesis refers to the attractive force of the measured atom on the AFM tip typically. As shown in FIG. 5E, the present invention can provide a resolution at least in the range of approximately 2 nm.

The invention having thus been described with particular reference to the preferred forms thereof, it will be obvious that various changes and modifications may be made therein without departing from the spirit and scope of the invention as defined in the appended claims.

What is claimed is:

1. A differential force microscope for identifying an individual atom comprising:
   means for exciting an atom of a substrate from a relaxed state to an excited state;
   an atomic force microscope including an electrically conductive tip positionable adjacent to a surface of said substrate, said conductive tip being influenced by attractive forces applied on said conductive tip by said atom in said relaxed state and said excited state; and
   means coupled to said atomic force microscope, for determining a differential attractive force of said attractive forces exerted by said atom in said relaxed state and said excited state on said conductive tip to allow identification of said atom.

2. The differential force microscope as recited in claim 1, wherein said means for exciting is a light source.

3. The differential force microscope as recited in claim 2, wherein said means for exciting emits light in an infrared range onto said surface of said substrate.

4. The differential force microscope as recited in claim 2, wherein said light source is tuned to a binding energy of said atom to prevent excitation of other atoms than said atom of said substrate.

5. The differential force microscope as recited in claim 2, wherein said means for exciting further includes a light chopper for chopping light emitted from said light source.

6. The differential force microscope as recited in claim 5, wherein said light chopper modulates light from said light source to produce light pulses having a rate which allows said atomic force microscope to measure synchronously said attractive forces of said atom in said relaxed state and said excited state.

7. The differential force microscope as recited in claim 1, wherein a passivation layer is positioned over said surface of said substrate to maintain said atom in said relaxed state, absent excitation by means for exciting.

8. The differential force microscope as recited in claim 1, further comprising means for maintaining said substrate at a predetermined temperature to prevent thermal energies from exciting said atom, absent excitation by said means for exciting.

9. The differential force microscope as recited in claim 1, further comprising means for applying a bias to said conductive tip to maintain said atom in said relaxed state, absent excitation by said exciting means.

10. The differential force microscope as recited in claim 1, further comprising means for applying a bias to said conductive tip to maintain said atom in said excited state, absent excitation by said exciting means.

11. The differential force microscope as recited in claim 1, further comprising means, coupled to said means for measuring, for displaying said differential attractive force of said atom.

12. The differential force microscope as recited in claim 1, wherein said atomic force microscope includes means for selectively moving said conductive tip across said surface of said substrate.

13. The differential force microscope as recited in claim 1, wherein said atomic force microscope includes a cantilever and said tip being connected to said cantilever, and said means for measuring measures said differential attractive force by measuring a frequency shift in a oscillation frequency of said cantilever when said atom is in said relaxed state and said excited state.

14. The differential force microscope as recited in claim 1, wherein said means for measuring measures said differential attractive force by measuring a difference between an electrostatic force of said tip when said atom is in said relaxed state and said excited state.

15. A method for detecting a specific atom in a substrate having a plurality of atoms, through the use of an atomic force microscope having an electrically conductive tip, the method comprising the steps of:
   (a) exciting and relaxing said atom between an excited state and a relaxed state; and
   (b) determining attractive forces exerted by said atom in said relaxed state and said excited state on said conductive tip so as to determine a differential attractive force, thereby allowing identification of said atom.

16. The method as recited in claim 15, wherein said step (a) and step (b) are repeated across a surface portion of said substrate to determine a concentration of said atom in said substrate.

* * * * *